(12) United States Patent　　(10) Patent No.:　　US 7,917,579 B2
　Izumi　　(45) Date of Patent:　　*Mar. 29, 2011

(54) CHAT SYSTEM, CHAT DEVICE, CHAT SERVER CONTROL METHOD, AND INFORMATION STORAGE MEDIUM INCLUDING CHAT STOP LIMITING CAPABILITY

(75) Inventor: Tadakatsu Izumi, Tokyo (JP)

(73) Assignee: Konami Digital Entertainment Co., Ltd., Tokyo (JP)

( * ) Notice: Subject to any disclaimer, the term of this patent is extended or adjusted under 35 U.S.C. 154(b) by 264 days.

This patent is subject to a terminal disclaimer.

(21) Appl. No.: 12/094,654

(22) PCT Filed: Dec. 15, 2006

(86) PCT No.: PCT/JP2006/325102
　§ 371 (c)(1),
　(2), (4) Date: May 22, 2008

(87) PCT Pub. No.: WO2007/074665
　PCT Pub. Date: Jul. 5, 2007

(65) Prior Publication Data
　US 2009/0276495 A1　　Nov. 5, 2009

(30) Foreign Application Priority Data

Dec. 28, 2005　(JP) ................................ 2005-380178

(51) Int. Cl.
　*G06F 15/16*　　(2006.01)
(52) U.S. Cl. ........ 709/203; 709/201; 709/204; 709/206; 709/207

(58) Field of Classification Search .................. 709/201, 709/203, 206, 204, 207
See application file for complete search history.

(56) References Cited

U.S. PATENT DOCUMENTS 6,799,199 B1 * 9/2004 Segal et al. .................. 709/207

(Continued)

FOREIGN PATENT DOCUMENTS

EP　　1 640 047 A1　　3/2006

(Continued)

OTHER PUBLICATIONS

"Final Fantasy XI Girato no Gen'ei Playing Manual", Square Enix, Mar. 2005, pp. 20, 99.

(Continued)

*Primary Examiner* — Djenane M Bayard
(74) *Attorney, Agent, or Firm* — Sughrue Mion, PLLC

(57) ABSTRACT

Provided are a chat system, a chat device, a chat server control method, and an information storage medium for realizing sound communication between users. When a message transfer unit (11a) receives a message, the message is transferred to a game terminal of a transmission destination and a stop limit unit (11c) transmits an instruction such as a limit instruction limiting a chat function stop processing in the game terminal to the game terminal of the transmission source of the message. A stop limit time calculation unit (11d) calculates a period of a stop limit time for limiting the chat function stop processing in accordance with the number of characters in the received message and a timer unit (11b) specifies a stop limit time end time instant. When the stop limit time end time instant has been reached, the stop limit unit (11c) transmits a limit cancel instruction for canceling the limit of the chat function stop processing.

17 Claims, 7 Drawing Sheets

U.S. PATENT DOCUMENTS

| | | | |
|---|---|---|---|
| 7,496,631 B2 * | 2/2009 | Austin-Lane et al. | 709/206 |
| 2002/0083179 A1 | 6/2002 | Shaw et al. | |
| 2002/0156854 A1 | 10/2002 | Matsumoto | |
| 2003/0060285 A1 | 3/2003 | Itakura | |
| 2004/0087371 A1 | 5/2004 | Yamana et al. | |
| 2004/0087372 A1 | 5/2004 | Yamana et al. | |
| 2004/0153557 A1 * | 8/2004 | Shochet et al. | 709/229 |
| 2005/0132011 A1 | 6/2005 | Muller et al. | |
| 2005/0267942 A1 | 12/2005 | Quinn et al. | |
| 2009/0100141 A1 * | 4/2009 | Kirkland et al. | 709/206 |

FOREIGN PATENT DOCUMENTS

| | | |
|---|---|---|
| JP | 2001-195319 A | 7/2001 |
| JP | 2001-198363 A | 7/2001 |
| JP | 2002-85850 A | 3/2002 |
| JP | 2002-319975 A | 10/2002 |
| JP | 2003-62350 A | 3/2003 |
| JP | 2003-164669 A | 6/2003 |
| JP | 2003-290549 A | 10/2003 |
| JP | 2004-350910 A | 12/2004 |
| JP | 2005-94385 A | 4/2005 |
| JP | 2005-267347 A | 9/2005 |

OTHER PUBLICATIONS

"Kyosei Shuryo Penalty System Donyu", [on line], Gamepot Inc., [interval date Feb. 27, 2007], Internet <URL:http://www.pangya.jp/050322penalty/>Mar. 2005.

European Patent Office Communication dated Apr. 23, 2009.

H. Schulzrinne, "Indication of Message Composition for Instant Messaging," IETF Standard, Internet Engineering Task Force, Columbia University, Abstract, p. 2, line 1—p. 8, line 9, 2005.

Taiwanese Search Report corresponding to Application No. 095148376 dated Oct. 5, 2009.

* cited by examiner

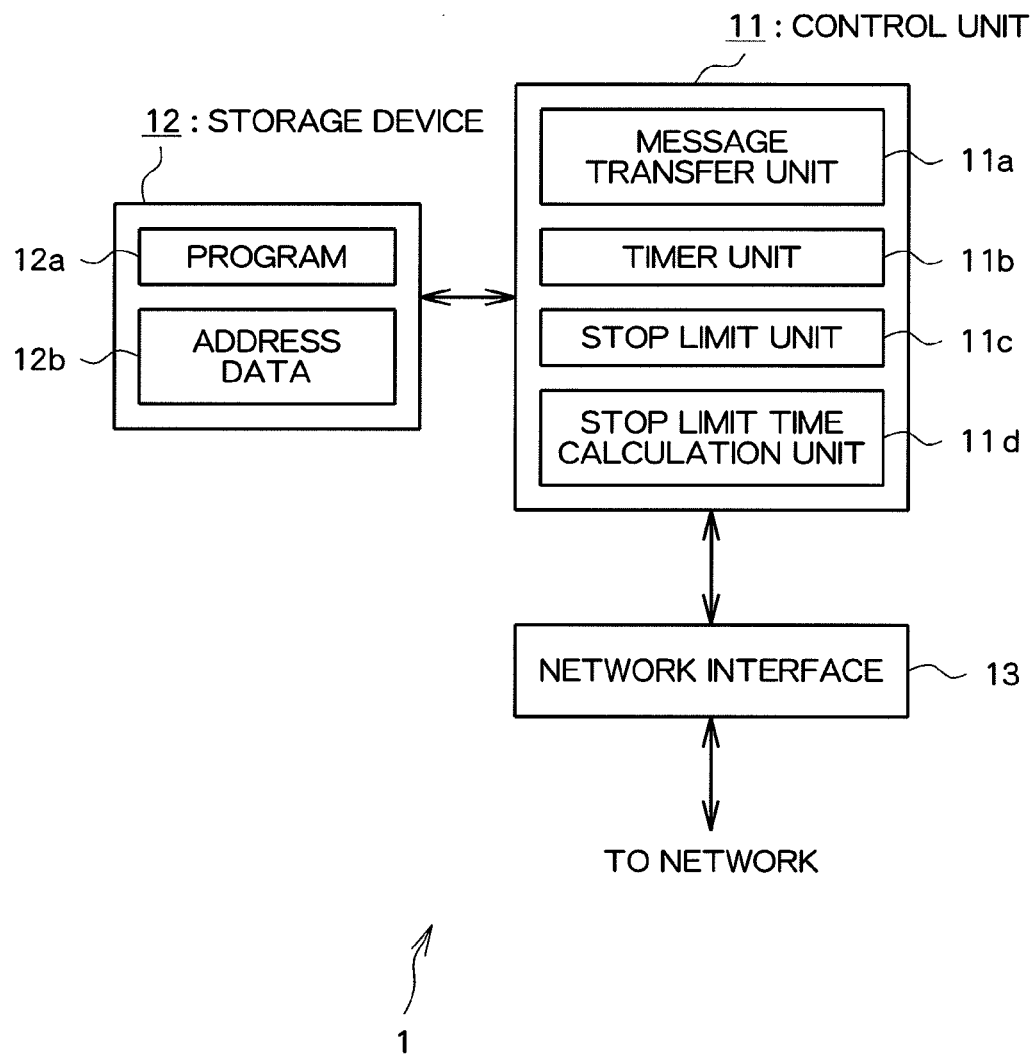

CHAT SYSTEM, CHAT DEVICE, CHAT SERVER CONTROL METHOD, AND INFORMATION STORAGE MEDIUM INCLUDING CHAT STOP LIMITING CAPABILITY

CROSS REFERENCE TO RELATED APPLICATIONS

This application is a National Stage of International Application No. PCT/JP2006/325102 filed on Dec. 15, 2006, claiming priority based on Japanese Patent Application No. 2005-380178, filed Dec. 28, 2005, the contents of all of which are incorporated herein by reference in their entirety.

This application is related to co-pending applications Ser. Nos. 12/159,910 and 12/162563 which entered the National Stage on Jul. 2, 2008.

TECHNICAL FIELD

The present invention relates to a chat system in which a messages are exchanged between chat devices, a chat device, a chat server control method, and an information storage medium.

BACKGROUND ART

Up to now, messages have been exchanged between chat devices to perform communication (chat) in real time. In particular, in an online game, each game terminal is generally mounted with a chat function for making the game more amusing, and various ideas are used for promoting communication between users. Patent Document 1 introduces a game device (chat device) which optimizes a time for displaying a message in accordance with the number of characters of the inputted message.

Patent Document 1: JP 2003-290549 A

DISCLOSURE OF INVENTION

Problems to be Solved by the Invention

However, according to the above-mentioned chat device, a user of each chat device can stop chatting at anytime, so if, for example, the user stops chatting immediately after making a comment, the user on the other end cannot be provided with an opportunity to reply to the comment. As a result, this causes the user on the other end to feel disadvantaged, which may accordingly make the communication between the users problematic.

The present invention has been made in view of the above-mentioned problem, and an object thereof is to provide a chat system, a chat device, a chat server control method, and an information storage medium for realizing good communication between users.

Means for Solving the Problems

In order to solve the above-mentioned problem, a chat system according to the present invention includes a plurality of chat devices, the chat devices each including: message input means for inputting a message by a user; message transmission means for transmitting the message inputted by the message input means; message reception means for receiving the message; message output means for outputting the message received by the message reception means; and message reception/output stop means for stopping reception and output of the message by the message reception means and the message output means, respectively, in response to a predetermined operation by the user. The chat system is characterized in that: the chat system further includes stop limit means for limiting stopping of the reception and output of the message that are performed by the message reception/output stop means; and the stop limit means limits the stopping of the reception and output of the message on a chat device during a predetermined chat stop limit time that is determined based on the message transmitted by the message transmission means of the chat device.

According to the present invention, it is possible to input/output a message between the respective chat devices and transmit/receive the message between the respective chat devices. Further, the reception and output of the message can be stopped on the chat device in response to the predetermined operation performed by the user of each chat device, while the reception and output of the message on the chat device can be limited during the predetermined chat stop limit time determined based on the message transmitted from the chat device. Accordingly, it is possible to secure an opportunity for the user who has received the message to reply to the message, to prevent the chat from ending with the conversation unfinished, and realize good communication between the users.

In one aspect of the present invention, the chat system may include timer means for measuring the predetermined chat stop limit time. According to this aspect, the chat stop limit time can be measured with accuracy. Then, the stopping of the reception and output of the message on the chat device that has transmitted the message can be limited during the measured chat stop limit time.

Further, in one aspect of the present invention, the stop limit means may be provided to each of the chat devices, or may be provided to the chat server. Herein, the chat server represents a server that receives the message transmitted from each of the chat devices and transfers the message to the rest of the chat devices.

Further, in one aspect of the present invention, the chat device may be a game terminal, and the chat server may be a game server.

Further, in one aspect of the present invention, the stop limit means may determine a length of the predetermined chat stop limit time based on a content of the message transmitted by the message transmission means. Accordingly, the user of the chat device that has received the message can secure a time corresponding to the content of the message as a time for inputting a reply message to the message. For example, the chat stop limit time may be set to be longer as the number of characters included in the message increases, or a time corresponding to the time required for inputting a message may be set as the chat stop limit time. With this configuration, the user who has received the message can secure the time corresponding to the length of the message as the time for inputting a reply message to the message, which accordingly can make the communication between the users good.

Further, a control method for a chat device according to the present invention is characterized by including the steps of: inputting a message; transmitting the inputted message; receiving the message; outputting the received message; stopping reception and output of the message in response to a predetermined operation by a user; and limiting stopping of the reception and output of the message during a predetermined chat stop limit time that is determined based on the transmitted message.

Further, an information storage medium according to the present invention is a computer-readable information storage medium recorded with a program for causing a computer to function as: message input means for inputting a message; message transmission means for transmitting the inputted message; message reception means for receiving the message; message output means for outputting the received message; message reception/output stop means for stopping reception and output of the message in response to a predetermined operation by a user; and stop limit means for limiting stopping of the reception and output of the message during a predetermined chat stop limit time that is determined based on the message transmitted by the message transmission means.

According to the present invention, it is possible on each of the chat devices to limit the stopping of the reception and output of the message on the chat device.

Further, a control method for a chat server according to the present invention is a control method for a chat server used in a chat system including a plurality of chat devices, and is characterized by including the steps of: receiving a message transmitted from each of the chat devices; transferring the received message to the rest of the plurality of chat devices; and limiting stopping of reception and output of the message on the chat device during a predetermined chat stop limit time that is determined based on the message transmitted from each of the chat devices.

Further, an information storage medium according to the present invention is a computer-readable information storage medium recorded with a program for causing a computer used in a chat system including a plurality of computers to function as: message reception means for receiving a message transmitted from each of the computers; message transfer means for transferring the received message to the rest of the plurality of computers; and stop limit means for limiting stopping of reception and output of the message on the computer during a predetermined chat stop limit time that is determined based on the message transmitted from each of the computers.

According to the present invention, the chat server can limit the stopping of reception and output of a message by each of the chat devices. This can reduce the processing executed on each of the chat devices and reduce the load on each of the chat devices.

BRIEF DESCRIPTION OF THE DRAWINGS

FIG. 3 is a configurational/functional block diagram of a game server according to a first embodiment of the present invention.

FIG. 4 is a diagram showing an example of a table in which a user ID and address data are stored in association with each other.

BEST MODE FOR CARRYING OUT THE INVENTION

Hereinafter, detailed description will be made of an embodiment (first embodiment) of the present invention with reference to the drawings.

Figure 1:
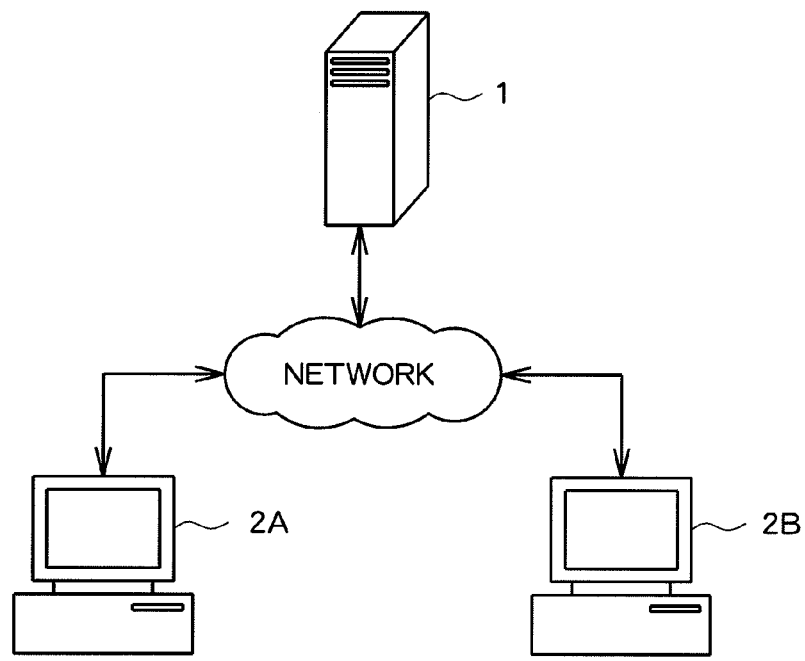
FIG. 1 is a diagram showing an example of an overall configuration of a chat system according to an embodiment of the present invention.

FIG. 1 is a diagram showing an overall configuration of a chat system according to an embodiment of the present invention. As shown in the figure, the chat system includes a game server 1 and game terminals 2A and 2B. The game server 1 and the game terminals 2 can communicate with one another via a network. In the following description, the game terminals 2A and 2B will be referred to simply as a game terminal 2 if there is no need for particular distinction between them.

The game server 1 is a known server including mainly a microprocessor, various storage devices, and a data communication device, and serves to manage/relay a chat performed between the game terminals 2. Meanwhile, the game terminals 2A and 2B are known computers such as a household game machine, an arcade game machine, a personal computer, a mobile phone set, or a personal digital assistant, which includes a monitor, input means such as a keyboard and a controller, a processor, various storage devices, and a data communication device, and are used by users to perform a chat (conversation performed by exchanging message character strings)

Figure 2:
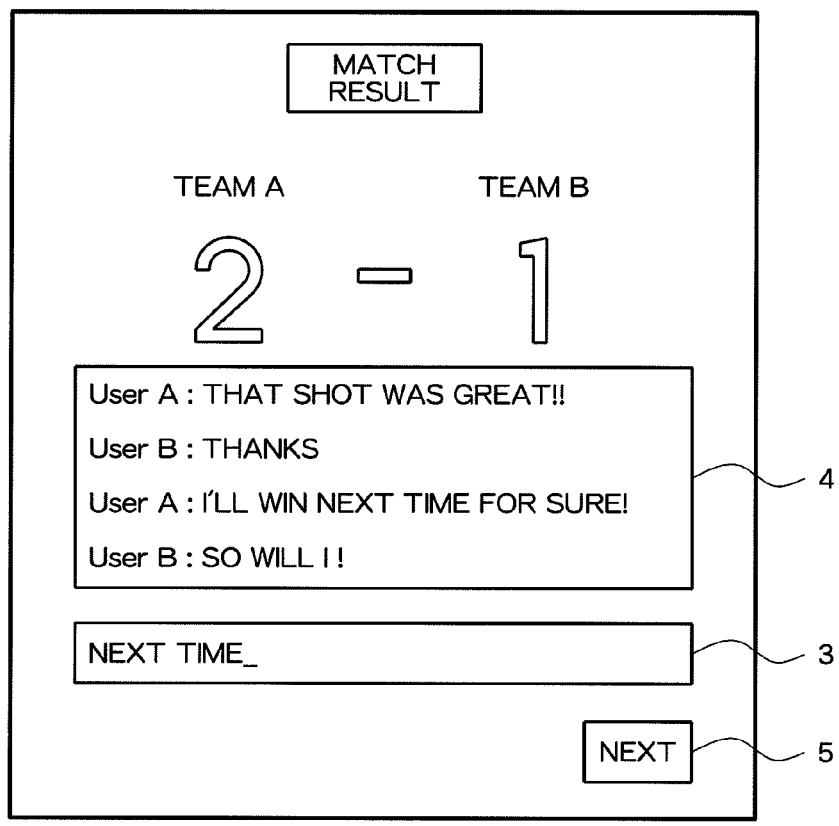
FIG. 2 is a diagram showing an example of a chat screen.

FIG. 2 is a diagram showing an example of a chat screen displayed on the monitor of the game terminal 2A during a competition-type online game. The same type of screen is displayed on the game terminal 2B. The example shown herein is a chat screen for a chat performed in a state in which a match result is displayed after the match of a soccer game has ended. As shown in the figure, a message input field 3 is placed in a lower portion of the screen, and a chat log field 4 is placed in an upper portion thereof. A user A of the game terminal 2A (hereinafter, a user of the game terminal 2A will be referred to as "user A", and a user of the game terminal 2B will be referred to as "user B") inputs a message into the message input field 3, and performs an input determination operation such as clicking on a send button (not shown) to determine the input of the message. When the user A determines the input of the message, the message is display-outputted into the chat log field 4 as a comment from the user A with a user ID of the user A (set herein as "User A") or the like. At the same time, the message is similarly display-outputted into the chat log field 4 of the chat screen displayed on the game terminal 2B, in response to which the user B inputs and transmits a message. Accordingly, the users A and B can have a conversation about, for example, a content of the match by inputting a message into each user's own message input field 3 while looking at each user's own chat log field 4 to chat with the user on the other end. To be specific, when the input determination operation is performed, the message inputted on the game terminal 2 is transmitted to the game server 1 along with information such as identification data (for example, user ID) of the user on the other end of the chat. The game server 1, in which the identification data of each user and a network address of the game terminal 2 of the user are prestored in association with each other, transfers the message to the network address corresponding to the transmitted identification data, that is, to the game terminal 2 of the user on the other end of the chat. Then, the game terminal 2 of the user on the other end receives the message, and display-outputs the message into the chat log field 4.

Further, in the screen shown in FIG. 2, when the user performs a chat stopping operation such as clicking on a button 5 labeled "next" placed at the lower right of the drawing, a chat function stops (ends). When the chat function stops (ends), the game terminal 2 comes into a state in which the game terminal 2 cannot receive a message addressed thereto from another game terminal 2. Note that another screen different from the chat screen may be displayed at this time. The button 5 may be expressed in any form as long as the button 5 is a chat function stop instruction image for instructing to stop the chat function. In FIG. 2, as an example of the chat function stop instruction image, the button 5 is a rectangle image added with the character string "next".

The game server 1 includes a known timer, and stores a message reception time instant transmitted from the game terminal 2 in a storage device such as a RAM. Further, a stop limit time is calculated based on a content of the received message. Herein, the number of characters in the message is counted, and a predetermined calculation expression or the like is used to calculate the stop limit time in accordance with the number of characters. The stop limit time represents a period during which the game server 1 limits the stopping of the chat function performed by the above-mentioned chat stopping operation. To be specific, during the stop limit time, a display mode of the "next" button 5 shown in FIG. 2 is changed so as to inhibit the user from clicking thereon, or even if the button 5 is clicked on, the corresponding processing to be executed is nullified. Examples of the change in display mode include displaying the "next" button 5 translucently, erasing the button 5 completely, and reducing a display size of the "next" button 5. In other words, during the stop limit time, the game server 1 inhibits the user of the game terminal 2 from executing the chat stopping operation itself, or nullifies the processing to be executed by the chat stopping operation to thereby limit the stopping of the chat function performed by the chat stopping operation. Note that, the stop limit time may be a predetermined period that is preset irrespective of the number of characters.

As described above, the game server 1 transfers the received message from the game terminal 2 to the different game terminal 2 of the user on the other end, and at the same time, records the message reception time instant of the message and calculates the stop limit time from the number of characters in the message. Thus, the stopping of the chat function performed by the above-mentioned chat stopping operation on the game terminal 2 that has transmitted the message is limited until the stop limit time has elapsed, with the message reception time instant being set as the start time instant of the stop limit time. In other words, the game server 1 inhibits the user of the game terminal 2 from stopping (ending) the chat function immediately after the game terminal 2 transmits a message.

According to the above-mentioned configuration, in the chat system, the chat stopping operation performed by the user who has transmitted a message is limited for a given period, and an opportunity to reply to the message is secured for the user who has received the message. Accordingly, it is possible to prevent the chat from ending with the conversation unfinished, and realize sound communication between the users.

Hereinafter, further detailed description will be made of a configuration and functions of this system.

FIG. 3 is a configurational/functional block diagram of the game server 1. As shown in the figure, the game server 1 includes a control unit 11, a storage device 12, and a network interface 13. The game server 1 may also include an input/output unit (not shown) including a keyboard, a monitor, and a DVD player, and an information storage medium (not shown) such as a DVD-ROM or a CD-ROM. The control unit 11 includes functional blocks composed of a message transfer unit 11a, a timer unit 11b, a stop limit unit 11c, and a stop limit time calculation unit 11d, and those functional blocks are realized by a predetermined program 12a stored in the storage device 12 being executed on the game server 1. Note that the program 12a may be stored in a computer-readable storage medium such as a DVD-ROM or CD-ROM described above.

The control unit 11, which includes, for example, a known CPU, receives a message from the game terminal 2, and also specifies a transmission destination of the message and transmits the message to the specified game terminal 2. Further, the control unit 11 counts the number of characters in the received message, and calculates the stop limit time in accordance with the number of characters. Then, the control unit 11 limits the stopping of the chat function performed by the chat stopping operation on the game terminal 2 that has transmitted the message. As described above, the control unit 11 includes functions composed of the message transfer unit 11a, the timer unit 11b, the stop limit unit 11c, and the stop limit time calculation unit 11d. Specific processing of those respective components will be described later.

The storage device 12 includes for example, a known memory such as a RAM. The storage device 12 stores the program 12a, which is outputted to the control unit 11. Further, the storage device 12 stores a user ID and address data 12b such as an IP address of the game terminal 2 corresponding to the user, which are acquired by a known art upon the start of a chat. A user ID and address data 12b are held in association with each other, as in a table shown in FIG. 4.

The network interface 13 represents a communication device such as a known network card, and transmits/receives data via the network.

Herein, description will be made of the specific processing of the respective components of the control unit 11.

The message transfer unit 11a is configured mainly by a known CPU, and is realized by execution of the program 12a. The message transfer unit 11a receives from the game terminal 2A the message and the user ID of the user (user B) on the other end of the chat via the network interface 13. Then, the message transfer unit 11a references the table of FIG. 4, and transmits the message to the address indicated by the address data 12b corresponding to the received user ID, that is, to the game terminal 2B.

The timer unit 11b is configured mainly by a known CPU and a timer, and is realized by the execution of the program 12a. The timer unit 11b measures a time instant (stop limit time start time instant) at which the message is received by the message transfer unit 11a, and further specifies another time instant (stop limit time end time instant) after the elapse of the above-mentioned stop limit time from the time instant.

The stop limit time calculation unit 11d is configured mainly by a known CPU, and is realized by the execution of the program 12a. The stop limit time calculation unit 11d counts the number of characters in the message received by the message transfer unit 11a, and calculates the stop limit time in accordance with the number of characters. To be specific, the number of characters in the message is multiplied by a predetermined stop limit time per character. Therefore, for example, if the number of characters in the message is 20 with the stop limit time per character being set as 0.5 seconds, the stop limit time is 10 seconds from 0.5×20.

The stop limit unit 11c is configured mainly by a known CPU, and is realized by the execution of the program 12a. When the message is received by the message transfer unit 11a, the stop limit unit 11c transmits various limit instructions to limit the chat stopping operation performed by the user A to the game terminal 2A. For example, the stop limit unit 11c transmits an instruction to translucently display or erase the "next" button 5 to inhibit clicking thereon, or even if the button 5 is clicked on, nullify the processing to be executed in response to the click. In other words, the stop limit unit 11c transmits instructions to limit the stopping of message reception and message output on the game terminal 2A, which are performed by the user A's chat stopping operation, to the game terminal 2A.

Further, when the stop limit time end time instant is reached, the stop limit unit 11c transmits to the game terminal 2A a limit cancel instruction for canceling the above-mentioned limit instruction. Accordingly, from the time of reception of the message until the stop limit time has elapsed, the stopping of the chat function performed by the user A's chat stopping operation is limited. The details of the processing performed on the game server 1 have been described above.

Figure 5:
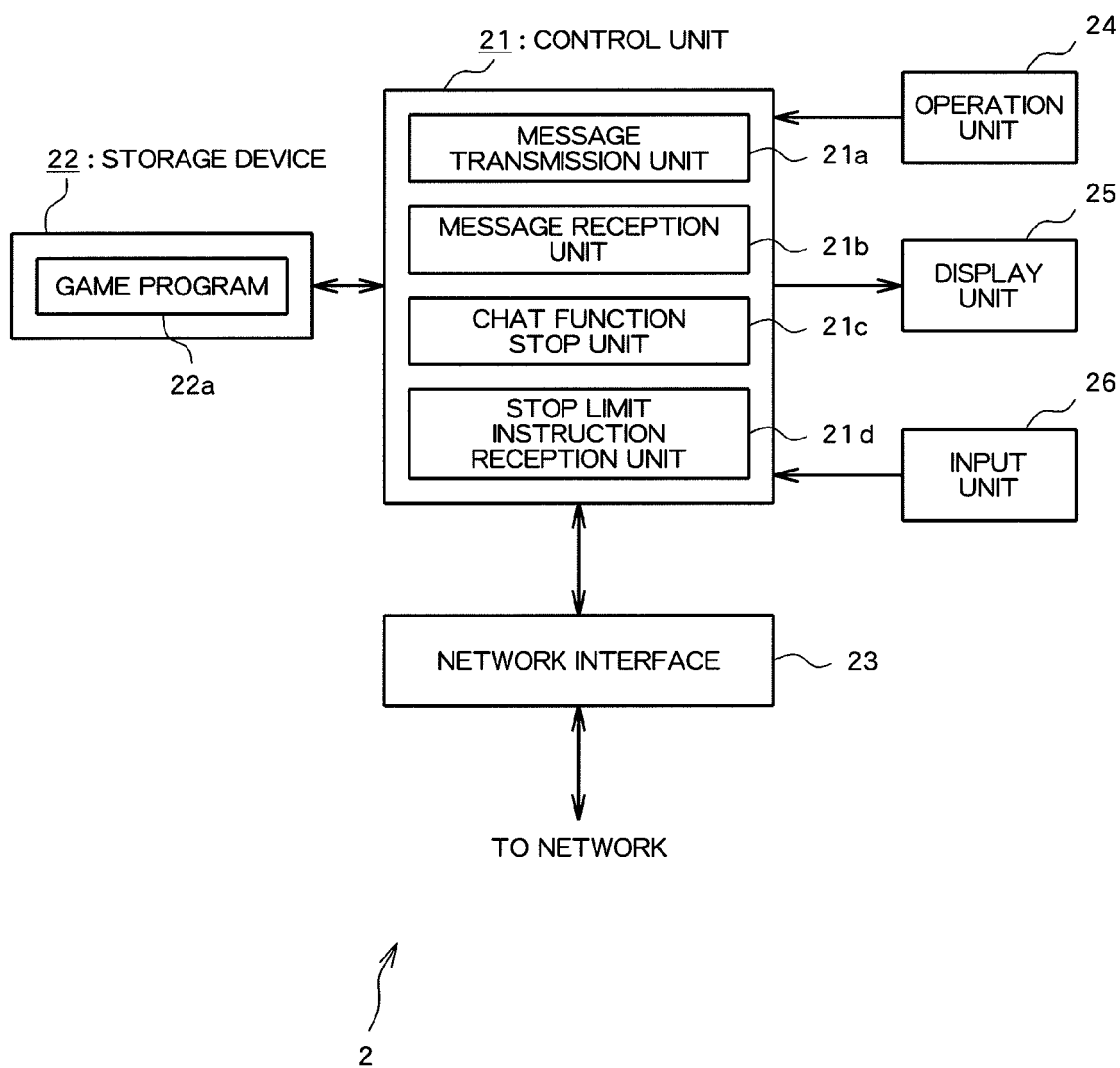
FIG. 5 is a configurational/functional block diagram of a game terminal according to the first embodiment of the present invention.

FIG. 5 is a configurational/functional block diagram of the game terminal 2. As shown in the figure, the game terminal 2 includes a control unit 21, a storage device 22, a network interface 23, an operation unit 24 including a controller and a keyboard, a display unit 25 such as a monitor, and an input unit 26 such as a DVD player. The control unit 21 includes functional blocks composed of a message transmission unit 21a, a message reception unit 21b, a chat function stop unit 21c, and a stop limit instruction reception unit 21d, and those functional blocks are realized by a predetermined game program 22a stored in the storage device 12 being executed on the game terminal 2. Note that the predetermined game program 22a may be stored in the computer-readable storage medium such as a DVD-ROM.

The control unit 21 is configured by for example a known CPU. The control unit 21 transmits a message inputted from the operation unit 24 to the game server 1 along with the user ID of the user on the other end of the chat. The control unit 21 also receives the message transferred from the game server 1, and outputs the message to the display unit 25. In response to the chat stopping operation performed by the user, the control unit 21 stops reception and output of the message transferred from the game server 1. As described above, the control unit 21 is composed of the message transmission unit 21a, the message reception unit 21b, the chat function stop unit 21c, and the stop limit instruction reception unit 21d. Specific processing of the respective components will be described later.

The storage device 22 is configured by for example, a known memory such as a RAM. The storage device 22 stores the predetermined game program 22a, which is outputted to the control unit 21. The network interface 23 represents a known communication device such as a network card, and transmits/receives data via the network.

Herein, description will be made of the specific processing of the respective components of the control unit 21.

The message transmission unit 21a, the message reception unit 21b, the chat function stop unit 21c, and the stop limit instruction reception unit 21d are configured mainly by a known CPU, and are realized by execution of the predetermined game program 22a. In response to the input determination operation such as clicking on a transmission button described above, the message transmission unit 21a transmits a message inputted from the operation unit 24 such as a keyboard or a controller to the game server 1 along with the user ID of the user on the other end of the chat. The message reception unit 21b receives the message transferred from the game server 1, and outputs the message into the chat log field 4 of a chat screen display-outputted on the display unit 25. In response to an input based on the chat stopping operation from the operation unit 24, the chat function stop unit 21c executes processing (chat function stop processing) relating to the stopping of the chat function, and stops the reception and output of the transferred message. The stop limit instruction reception unit 21d receives the above-mentioned limit instruction and the limit cancel instruction from the game server 1. Then, the chat function stop processing performed by the chat function stop unit 21c is limited from the reception of the above-mentioned limit instruction until the reception of the limit cancel instruction. In other words, the chat function stop processing is limited from the transmission of the message until the elapse of the stop limit time. The details of the processing performed on the game terminal 2 have been described above.

Figure 6:
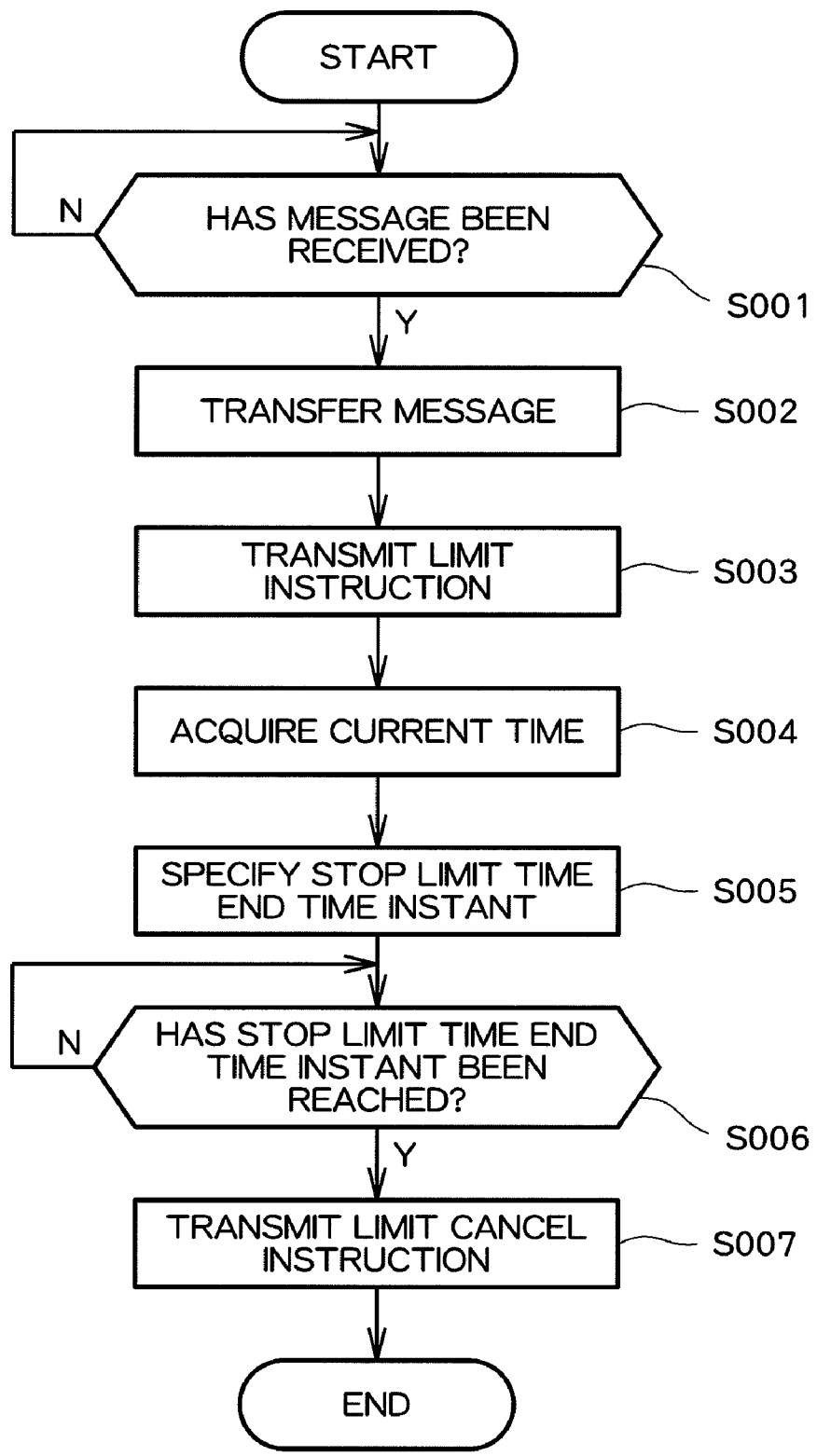
FIG. 6 is a flowchart showing an example of message transfer processing and chat function stop limit processing that are performed on the game server according to the first embodiment of the present invention.

Next, further detailed description will be made of the processing of the game server 1. FIG. 6 is a flowchart showing an example of message transfer processing and chat function stop limit processing that are performed by the game server 1. As shown in the figure, the game server 1 monitors whether or not a message has been received from the game terminal 2 (S001). If the message transfer unit 11a receives a message, the game server 1 references the above-mentioned table shown in FIG. 4 to specify the address which corresponds to the user ID of the user on the other end of the chat received along with the message, and transfers the message to the game terminal 2 corresponding to the address (S002). The steps so far correspond to the specific details of the message transfer processing. After that, the chat function stop limit processing is started. In other words, the stop limit unit 11c transmits the above-mentioned limit instruction, that is, the instruction to limit the chat function stop processing performed by the chat. function stop unit 21c of the game terminal 2, to the game terminal 2 of the message transmission source (S003). The timer unit 11b acquires a current time instant at the time of reception of the message (S004). The stop limit time calculation unit 11d counts the number of characters in the received message, and calculates the stop limit time by multiplying the number of characters by a predetermined stop limit time per character. Note that the stop limit time may be calculated, for example, by using an existing mathematical expression or referencing a predetermined table. Then, the timer unit 11b specifies the time instant at the time of the elapse of the calculated stop limit time from the acquired current time instant, that is, the stop limit time end time instant (S005).

If the stop limit time end time instant is reached (S006), the stop limit unit 11c transmits the above-mentioned limit cancel instruction to the game terminal 2 of the message transmission source, and cancels the limit of the chat function stop processing on the game terminal 2 (S007). The details of the message transfer processing and the chat function stop limit processing that are performed by the game server 1 have been described above. According to this processing, the user who has received the message can secure an opportunity to reply to the message to prevent the chat from ending with the conversation unfinished. Further, during the period corresponding to the number of characters in the message, the stopping of the chat function on the game terminal 2 of the message transmission source is limited, which prevents the user of a message sender and the user of a message recipient from feeling disadvantaged in the length of message that can be inputted. Note that the processing of Steps S002 to S004 is executed in response to a message received by the message transfer unit 11a, and is not necessarily executed in this order.

The details of the embodiment (first embodiment) of the present invention have been described above.

Next, description will be made of another embodiment (second embodiment) of the present invention. In the first embodiment, the timer unit 11b, the stop limit time calculation unit 11d, and the stop limit unit 11c are included in the game server 1, and it is the game server 1 that limits the stopping of the chat function in response to the chat stopping operation. However, in the second embodiment, those functions are provided to each game terminal 2, the game terminal 2 of the message transmission source causes itself to limit the stopping of the chat function in response to the chat stopping operation, and the game server 1 is caused to execute only the message transfer processing. Hereinafter, the description will be made with reference to the drawings. Note that, in the following description, the reference symbols used in the first embodiment will be cited for components having the same names.

A chat system according to the second embodiment has an overall configuration the same as the configuration shown in FIG. 1, and is configured by including the game terminals 2A and 2B and the game server 1. As in the first embodiment, the user of each game terminal 2 transmits/receives a message on the chat screen as shown in FIG. 2 to execute a chat.

Figure 7:
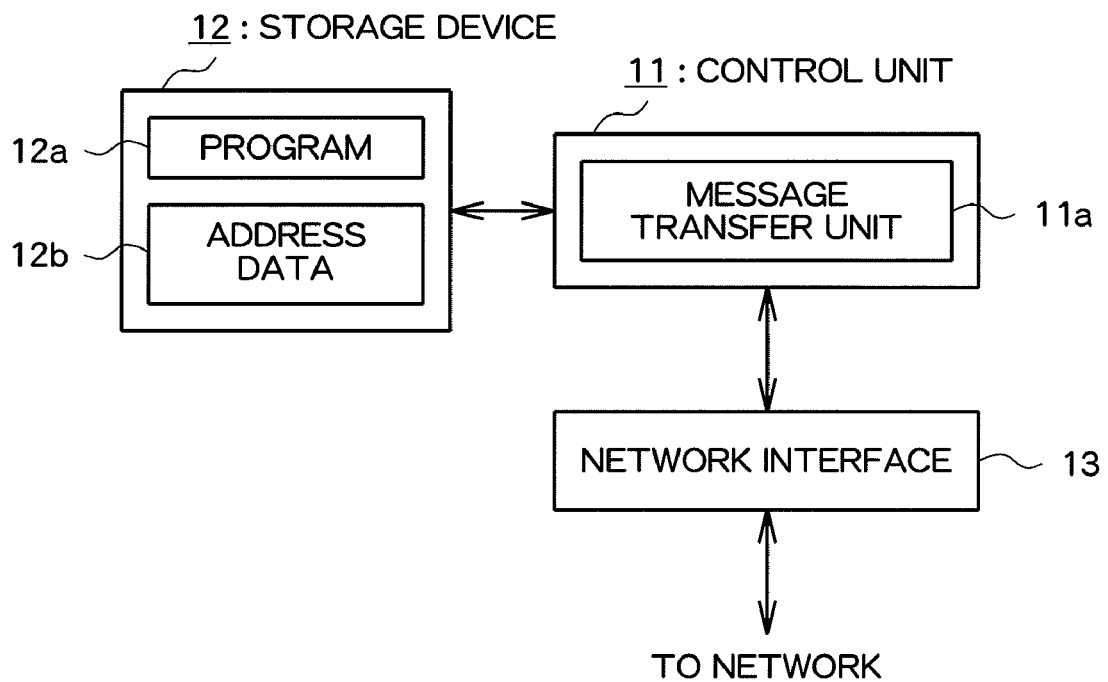
FIG. 7 is a configurational/functional block diagram of a game server according to a second embodiment of the present invention.

FIG. 7 is a configurational/functional block diagram of the game server 1. As shown in the figure, the game server 1 includes the control unit 11, the storage device 12, and the network interface 13. The game server 1 may also include the input/output unit (not shown) such as a keyboard, a monitor, and a DVD player, and the information storage medium (not shown) such as a DVD-ROM or a CD-ROM. The control unit 11 includes functional blocks composed of a message transfer unit 11a, and those functional blocks are realized by the predetermined program 12a stored in the storage device 12 being executed on the game server 1. Note that the predetermined program 12a may be stored in the computer-readable storage medium such as a DVD-ROM or CD-ROM described above.

The control unit 11, which is configured by for example a known CPU. The control unit 11 receives a message from the game terminal 2, and also specifies the transmission destination of the message and transmits the message to the specified game terminal 2. As described above, the control unit 11 includes the function of the message transfer unit 11a. The message transfer unit 11a is configured mainly by a known CPU, and is realized by the execution of the predetermined program 12a. The message transfer unit 11a receives from the game terminal 2A the message and the user ID of the user (user B) on the other end of the chat via the network interface 13. Then, the message transfer unit 11a references the table of FIG. 4 stored in the storage device 12, and transmits the message to the address indicated by the address data 12b corresponding to the received user ID, that is, to the game terminal 2B.

The storage device 12 and the network interface 13 are the same as those of the first embodiment. The details of the processing performed on the game server 1 according to the second embodiment has been described above.

Figure 8:
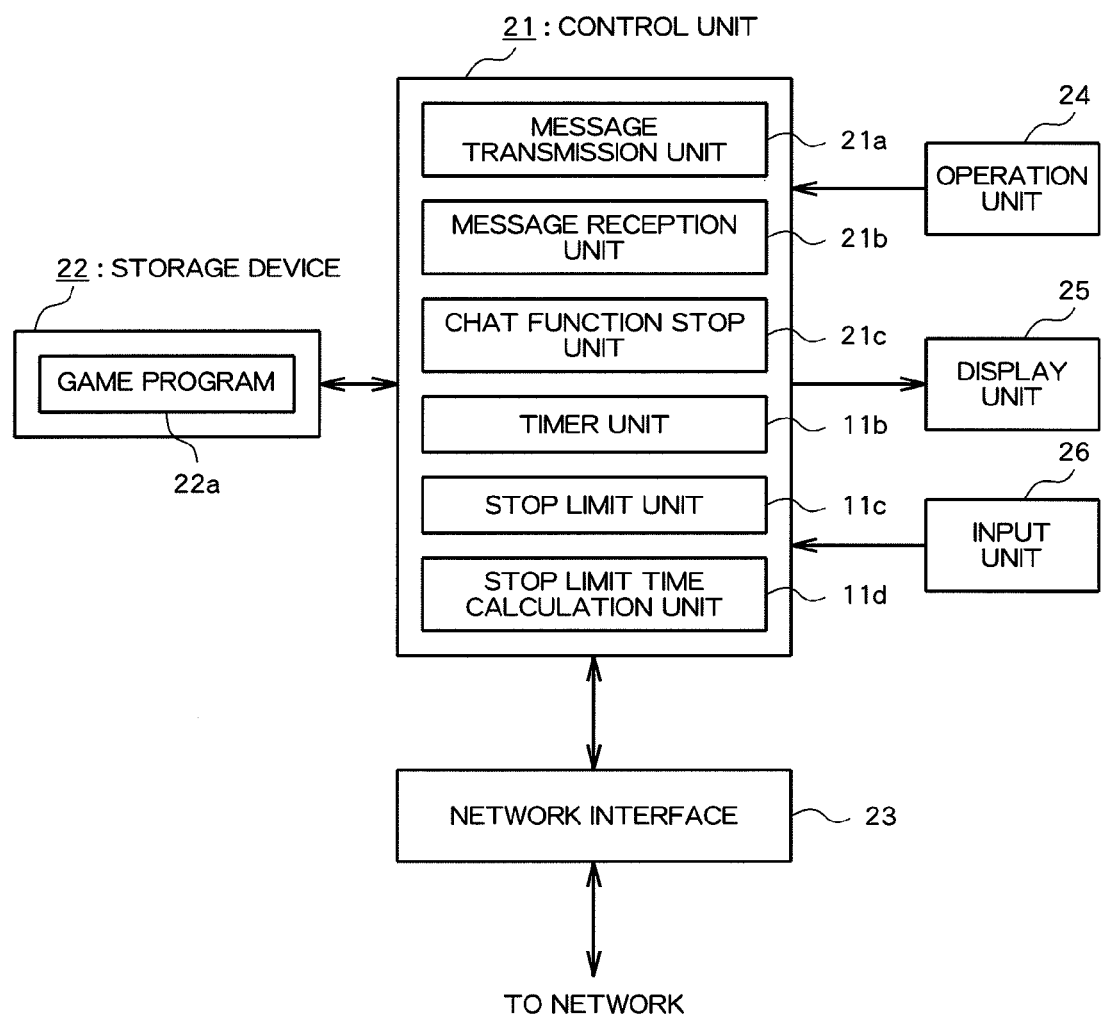
FIG. 8 is a configurational/functional block diagram of a game terminal according to the second embodiment of the present invention.

FIG. 8 is a configurational/functional block diagram of the game terminal 2. As shown in the figure, the game terminal 2 includes the control unit 21, the storage device 22, the network interface 23, the operation unit 24 such as a controller and a keyboard, the display unit 25 such as a monitor, and the input unit 26 such as a DVD player. The control unit 11 includes functional blocks composed of the message transmission unit 21a, the message reception unit 21b, the chat function stop unit 21c, the timer unit 11b, the stop limit unit 11c, and the stop limit time calculation unit 11d, and those functional blocks are realized by the predetermined game program 22a stored in the storage device 22 being executed on the game terminal 2. Note that the predetermined game program 22a may be stored in the computer-readable storage medium such as a DVD-ROM. Herein, the respective components other than the control unit 21 are the same as those of the first embodiment.

The control unit 21 is configured by for example a known CPU. The control unit 21 transmits a message inputted from the operation unit 24 to the game server 1 along with the user ID of the user on the other end of the chat. The control unit 21 also receives the message transferred from the game server 1, and outputs the message to the display unit 25. In response to the chat stopping operation performed by the user, the control unit 21 stops the reception and output of the message transferred from the game server 1. As described above, the control unit 21 is composed of the message transmission unit 21a, the message reception unit 21b, the chat function stop unit 21c, the timer unit 11b, the stop limit unit 11c, and the stop limit time calculation unit 11d.

The message transmission unit 21a, the message reception unit 21b, the chat function stop unit 21c, the timer unit 11b, the stop limit unit 11c, and the stop limit time calculation unit 11d are configured mainly by a known CPU, and are realized by the execution of the predetermined game program 22a. In response to the input determination operation, such as clicking on a transmission button described above, the message transmission unit 21a transmits a message inputted from the operation unit 24, such as a keyboard or a controller to the game server 1, along with the user ID of the user on the other end of the chat. The message reception unit 21b receives the message transferred from the game server 1, and outputs the message into the chat log field 4 on the display unit 25. In response to an input based on the chat stopping operation from the operation unit 24, the chat function stop unit 21c executes the processing (chat function stop processing) relating to the stopping of the chat function, and stops the reception and output of the message transferred to the game terminal 2.

The timer unit 11b measures a time instant (stop limit time start time instant) at which the message is transmitted by the message transmission unit 21a, and further specifies another time instant (stop limit time end time instant) after the elapse of the above-mentioned stop limit time from the time instant.

The stop limit time calculation unit 11d counts the number of characters in the message transmitted by the message transmission unit 21a, and calculates the stop limit time in accordance with the number of characters. To be specific, as in the first embodiment, the stop limit time calculation unit 11d multiplies the number of characters in the transmitted message by the stop limit time per character. When the message is transmitted by the message transmission unit 21a, the stop limit unit 11c limits the chat function stop processing performed by the chat function stop unit 21c in response to the user's chat stopping operation, that is, the processing relating to the stopping of message reception and message output. Further, when the stop limit time end time instant is reached, the stop limit unit 11c cancels the limit of the chat function stop processing. The details of the processing performed on the game terminal 2 has been described above.

Figure 9:
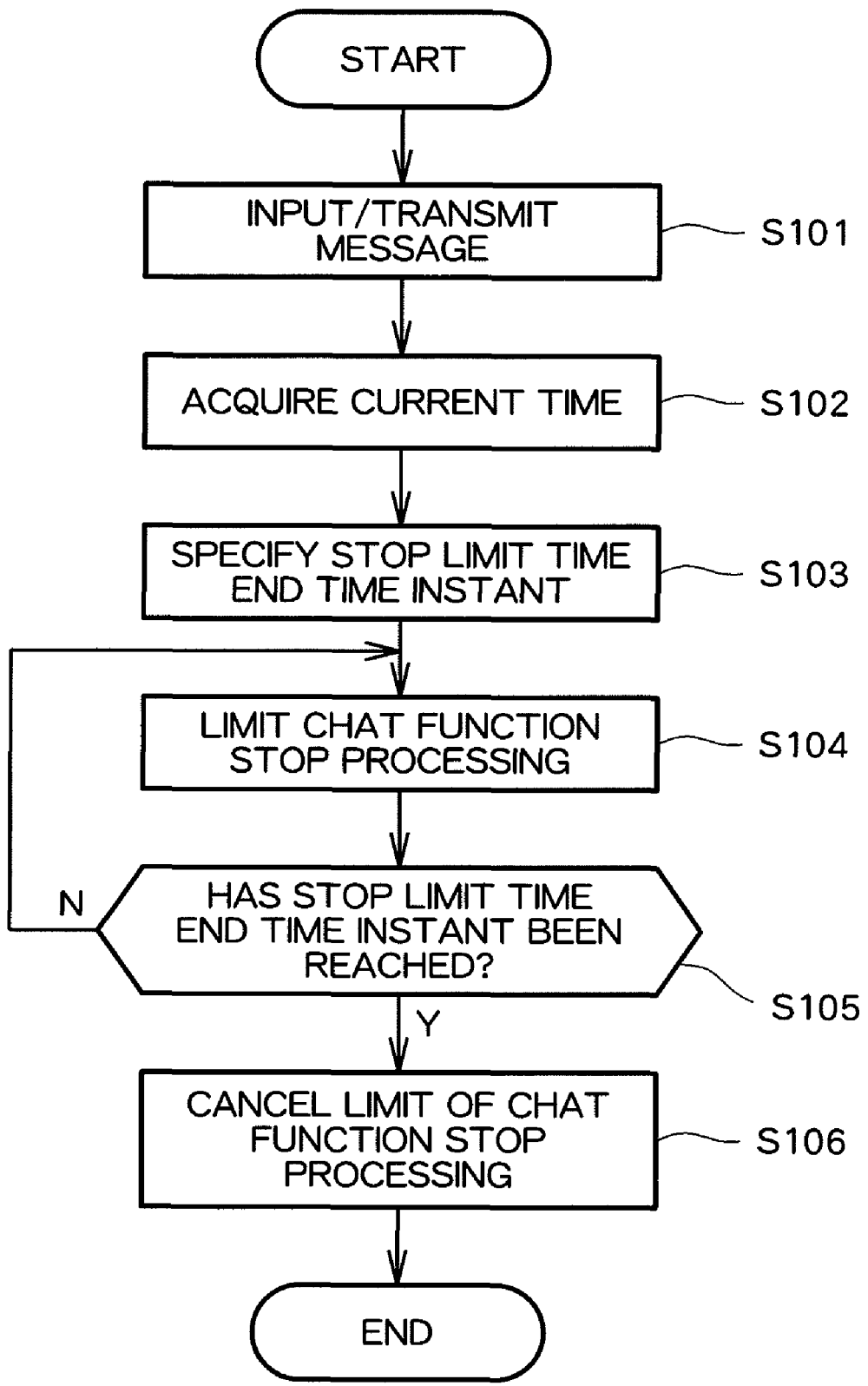
FIG. 9 is a flowchart showing an example of message transfer processing and chat function stop limit processing that are performed on the game terminal according to the second embodiment of the present invention.

Next, further detailed description will be made of the processing of the game terminal 2. FIG. 9 is a flowchart showing an example of the message transmission processing and the chat function stop limit processing that are performed by the game terminal 2. As shown in the figure, in response to the input determination operation, such as clicking on the transmission button of FIG. 2, the message transmission unit 21a transmits a message inputted by the user (S101). The step so far corresponds to the message transmission processing. After that, the game terminal 2 performs the chat function stop limit processing. In other words, the timer unit 11b acquires the current time instant at the time of reception of the message (S102). The stop limit time calculation unit 11d counts the number of characters in the transmitted message, and calculates the stop limit time by multiplying the number of characters by the stop limit time per character. Then, the timer unit 11b specifies the time instant at the time of the elapse of the calculated stop limit time from the acquired current time instant, that is, the stop limit time end time instant (S103). After the transmission of the message, the stop limit unit 11c limits the chat function stop processing executed by the chat function stop unit 21c in response to the user's operation (S104).

Further, when the stop limit time end time instant is reached (S105), the stop limit unit 11c cancels the limit of the chat function stop processing (S106). The details of the message transmission processing and the chat function stop limit processing that are performed by the game terminal 2 have been described above. Note that, the processing of Steps S102 to S104 is executed in response to a message transmitted by the message transmission unit 21a, and is not necessarily executed in this order.

According to the first and second embodiments as described above, the user who has received the message can secure an opportunity to reply to the message to prevent the chat from ending with the conversation unfinished, and realize good communication between the users. Further, according to the second embodiment, the load on the game server 1 can be reduced by causing each game terminal 2 to perform the chat function stop limit processing. The details of the second embodiment of the present invention have been described above.

Note that the present invention is not limited to the embodiments described above.

For example, the number of users who perform a chat is not limited to 2. In other words, the present invention may be applied to an embodiment in which the game server 1 is communicatively connected to a plurality of game terminals 2 via the network, and the game server 1 transfers messages transmitted by a given game terminal 2 to the rest of the plurality of game terminals 2. In other words, the present invention is applicable to a conference-type chat. Even according to this embodiment, as in the first and second embodiments, the user who has received the message can secure an opportunity to reply to the message to thereby prevent the chat from ending with the conversation unfinished.

Further, in the first and second embodiments, the game terminals 2 and the game server 1 are used as devices composing the chat system, but general communication devices such as personal computers or personal digital assistants may be used instead of the game terminals 2, and a known general server computer may be used instead of the game server 1. With this configuration, the chat may be performed in different situations from online gaming. In other words, the present invention can be applicable to a general chat that is performed with personal computers as the chat devices and a server computer as the chat server.

Further, a server device such as the game server 1 herein relays a message between client devices such as the game terminals 2, but the present invention may be applied to an embodiment in which the respective client devices form a so-called peer-to-peer network to perform direct communication with each other. This is realized by causing each of the client devices itself to execute the chat function stop limit processing in a similar manner as the game terminal 2 of the second embodiment.

Further, the stop limit time is not limited to the time in accordance with the number of characters in the message. For example, the time corresponding to a time required for inputting a message may be set as the stop limit time.

Further, the end timing of the stop limit time does not always need to be the stop limit time end time instant specified by the timer unit 11b. For example, if the stop limit time end time instant is reached while a reply message is being inputted by the user of a message transmission destination, the stop limit time end time instant may be extended to a time instant at which the reply message is transmitted. According to this configuration, it is possible to prevent the chat function from being stopped in response to the chat stopping operation performed by the user on the other end while the user is inputting the reply message.

Further, in the first embodiment, in a case where the stopping of the chat function is limited on the game terminal 2 of the message transmission source, when the game server 1 receives a reply message from the game terminal 2 of the message transmission destination, that time is used for ending the limit of the stopping of the chat function on the game terminal 2 of the message transmission source. Further, similarly in the second embodiment, in a case where the stopping of the chat function is limited on the game terminal 2 of a message transmission source, the limit of the stopping of the chat function on the game terminal 2 of the message transmission source may be ended at a time when the game terminal 2 receives the reply message from the game terminal 2 of the message transmission destination. This is because the object to secure an opportunity to reply to the message for the user who has received the message has been achieved.

The invention claimed is:

1. A chat system, comprising a plurality of chat devices, the chat devices each comprising: message input means for inputting a message by a user; message transmission means for transmitting the message inputted by the message input means; message reception means for receiving the message; message output means for outputting the message received by the message reception means; and message reception/output stop means for stopping reception and output of the message by the message reception means and the message output means, respectively, in response to a predetermined operation by the user, wherein: the chat system further comprises stop limit means for preventing the user from quitting the chat system for a predetermined chat stop time and the stop limit means prevents the user from quitting the chat system for the predetermined chat stop time on a chat device during the predetermined chat stop limit time that is determined based on the message transmitted by the message transmission means of the chat device, wherein the stop limit means prevents the user from quitting the chat system based on a predetermined calculation expression that comprises a number of characters per message multiplied by a time quantity per number of characters to produce said predetermined chat stop limit time, and further wherein each of said chat devices comprises a processor.

2. A chat system according to claim 1, further comprising timer means for measuring the predetermined chat stop limit time.

3. A chat system according to claim 2, wherein the stop limit means determines a length of the predetermined chat stop limit time based on a content of the message transmitted by the message transmission means.

4. A chat system according to claim 1, wherein the stop limit means is provided to each of the chat devices.

5. A chat system according to claim 4, wherein the stop limit means determines a length of the predetermined chat stop limit time based on a content of the message transmitted by the message transmission means.

6. A chat system according to claim 1, further comprising a chat server for receiving the message transmitted from each of the chat devices, and transferring the message to the rest of the chat devices,
wherein the stop limit means is provided to the chat server.

7. A chat system according to claim 6, wherein the chat device comprises a game terminal, and the chat server comprises a game server.

8. A chat system according to claim 7, wherein the stop limit means determines a length of the predetermined chat stop limit time based on a content of the message transmitted by the message transmission means.

9. A chat system according to claim 6, wherein the stop limit means determines a length of the predetermined chat stop limit time based on a content of the message transmitted by the message transmission means.

10. A chat system according to claim 1, wherein the stop limit means determines a length of the predetermined chat stop limit time based on a content of the message transmitted by the message transmission means.

11. The chat system of claim 1, wherein said stop limit means limits the stopping of the reception and output of the message by inhibiting a user from performing a processing operation, or nullifying the results of a selected processing operation.

12. A control method for a chat device used in a chat system, comprising the steps of:
inputting a message;
transmitting the inputted message;
receiving the message;
outputting the received message;
stopping reception and output of the message in response to a predetermined operation by a user; and
preventing the user from quitting the chat system for a predetermined chat stop time, that is determined based on the transmitted message,
wherein the preventing the user from quitting the chat system is based on a predetermined calculation expression that comprises a number of characters per message multiplied by a time quantity per number of characters to produce said predetermined chat stop limit time.

13. The control method of claim 12, wherein the stopping of the reception and output of the message is based on a predetermined calculation expression.

14. The control method of claim 12, wherein said stopping of the reception and output of the message comprises inhibiting a user from performing a processing operation, or nullifying the results of a selected processing operation.

15. A control method for a chat server used in a chat system including a plurality of chat devices, comprising the steps of:
receiving a message transmitted from each of the chat devices;
transferring the received message to the rest of the plurality of chat devices; and
preventing the user from quitting the chat system for a predetermined chat stop time, that is determined based on the message transmitted from each of the chat devices,
wherein the preventing the user from quitting the chat system is based on a predetermined calculation expression that comprises a number of characters per message multiplied by a time quantity per number of characters to produce said predetermined chat stop limit time.

16. A non-transitory computer-readable information storage medium recorded with a program for causing a computer to function as: message input means for inputting a message; message transmission means for transmitting the inputted message; message reception means for receiving the message; message output means for outputting the received message; message reception/output stop means for stopping reception and output of the message in response to a predetermined operation by a user and stop limit means for preventing the user from quitting the chat system for a predetermined chat stop time, that is determined based on the message transmitted by the message transmission means, wherein the stop limit means prevents the user from quitting the chat system based on a predetermined calculation expression that comprises a number of characters per message multiplied by a time quantity per number of characters to produce said predetermined chat stop limit time.

17. A non-transitory computer-readable information storage medium recorded with a program for causing a computer used in a chat system including a plurality of computers to function as: message reception means for receiving a message transmitted from each of the computers; message transfer means for transferring the received message to the rest of the plurality of computers; and stop limit means for preventing the user from quitting the chat system for a predetermined chat stop time, that is determined based on the message transmitted from each of the computers, wherein the stop limit means prevents the user from quitting the chat system based on a predetermined calculation expression that comprises a number of characters per message multiplied by a time quantity per number of characters to produce said predetermined chat stop limit time.

* * * * *